Apr. 24, 1923. 1,452,729
R. DE BOER
FOUR-HORSE EVENER
Filed Jan. 27, 1922 2 Sheets-Sheet 2
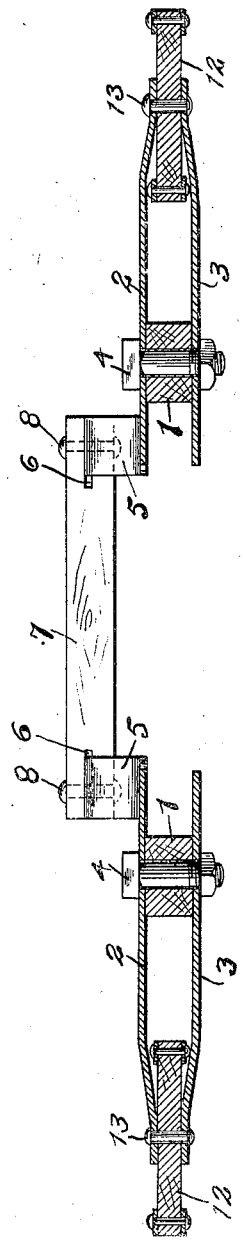
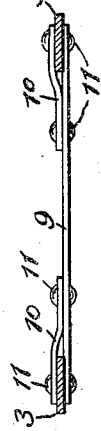
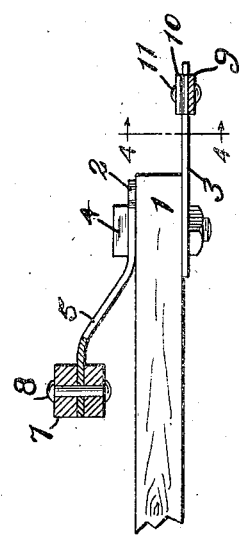
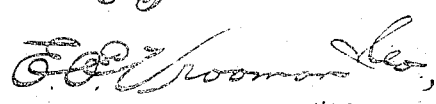
Inventor
Ralph De Boer Patented Apr. 24, 1923.

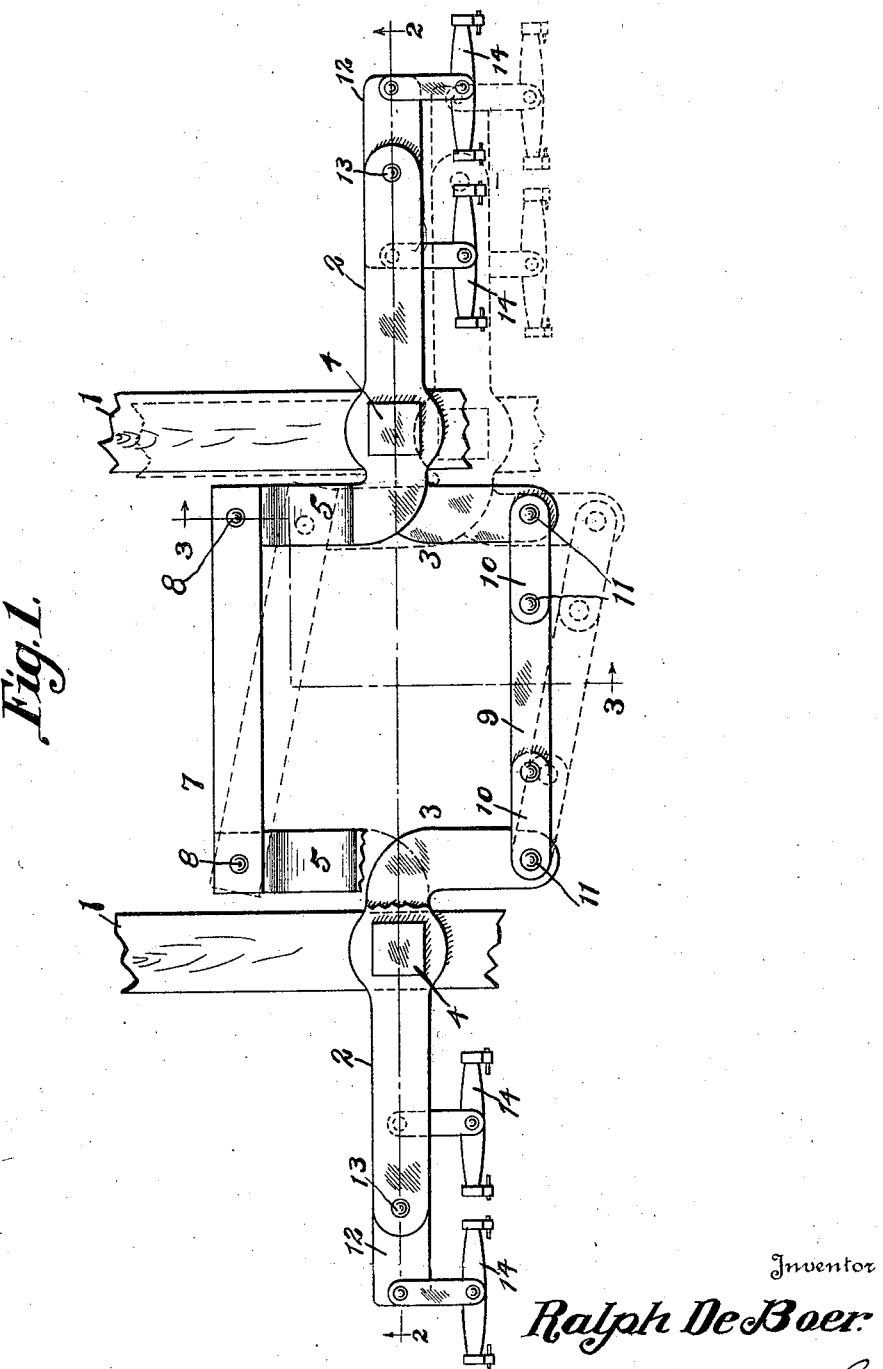

1,452,729

UNITED STATES PATENT OFFICE.

RALPH DE BOER, OF SHELDON, IOWA.

FOUR-HORSE EVENER.

Application filed January 27, 1922. Serial No. 532,207.

*To all whom it may concern:*

Be it known that I, RALPH DE BOER, a citizen of the United States, residing at Sheldon, in the county of O'Brien and State of Iowa, have invented certain new and useful Improvements in Four-Horse Eveners, of which the following is a specification, reference being had therein to the accompanying drawings.

This invention relates to a four-horse evener or hitch for use for a two-row cultivator.

The object of the invention is the construction of a simple and efficient evener apparatus, which can be attached to a cultivator by a pair of bolts, and which evener operates to even the strain of the teams, should one team pull ahead of the other, causing a steady strain or pulling action upon the cultivator, resulting in the cultivator being drawn straight ahead at all times.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a top plan view of an apparatus constructed in accordance with the present invention.

Figure 2 is a sectional view, taken on line 2—2, Fig. 1, and looking in the direction of the arrows.

Figure 3 is a sectional view, taken on line 3—3, Fig. 4, and looking in the direction of the arrows.

Figure 4 is a sectional view, taken on line 4—4, Fig. 3, and looking in the direction of the arrows.

Referring to the drawings by numerals, 1—1, designates the beams of the cultivator. My apparatus comprises a pair of substantially L-shaped, upper lever arms 2, and a pair of lower, L-shaped lever arms 3. These lever arms 2 and 3 are supported upon opposite sides of the beams 1, by means of bolts 4.

The upper lever arms 2 have their inner ends bent upwardly, at 5, and these inner ends extend into bifurcations 6 formed in the ends of the upper connecting link 7. Rivets 8 extend through the ends of link 7, and the inner ends of lever arms 2 pivotally connect the same together.

While the inner ends of the upper lever arms extend inwardly (Fig. 1), the inner ends of the lower lever arms 3 extend outwardly, and against these outwardly-extending inner ends bears the lower connecting link 9. Plates 10 are laid against the link 9 and the inner ends of arms 3 and by means of rivets 11, the arms 3, plates 10 and link 9 are fastened together. Double trees 12 are pivotally mounted, by bolts or rivets 13, between the outer ends of the upper lever arms 2 and the lower lever arms 3. Suitably mounted upon the double trees 12 are single trees 14.

The draft animals are hitched to the single trees 14, and in the event of either pair pulling ahead of the other pair, the evener will distribute the strain, resulting in the cultivator pulling straight ahead.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In an apparatus of the class described, the combination of a pair of cultivator beams, a pair of upper, L-shaped lever arms resting on said beams, the inner ends of said lever arms extending inwardly between the beams, a pair of lower, L-shaped lever arms against the beams, the inner ends of said lever arms extending outwardly between the beams, an upper link provided with bifurcations in its ends, the inner ends of said upper lever arms in said bifurcations, means pivotally connecting the inner ends of the upper lever arms and the ends of said connecting link, a lower link against the inner ends of the lower lever arms between the beams, plates on said lower link and said inner ends of the lower lever arms, fastening means connecting the lower lever arms, lower link and plates together, and draft animal connecting means pivotally secured between the outer ends of said upper and lower lever arms.

2. In an apparatus of the class described, the combination with a pair of cultivator beams, of L-shaped, upper lever arms pivotally mounted on said beams, said lever arms provided with inner, upwardly-extending ends between the beams, a bifurcated connecting link on said upwardly-extending ends, lower, L-shaped lever arms pivotally mounted on said beams, a connecting link connecting the inner ends of said lower lever arms, double trees between the outer ends of said upper and lower lever arms, and means pivotally fastening said double trees on said arms.

3. In an apparatus of the class described, the combination with a pair of cultivator beams, of upper and lower lever arms on said beams, said upper lever arms and lower lever arms having their inner ends positioned between the beams and extending in opposite directions, means pivotally connecting the inner ends of said upper lever arms, means pivotally connecting the inner ends of said lower lever arms, and draft animal attaching means pivotally mounted upon the outer ends of said lever arms.

In testimony whereof I hereunto affix my signature.

RALPH DE BOER.